United States Patent
Wu et al.

(10) Patent No.: US 11,963,046 B2
(45) Date of Patent: Apr. 16, 2024

(54) ROAMING METHOD IN A MULTI-LINK SCENARIO, MULTI-LINK DEVICE, AND STORAGE MEDIUM

(71) Applicant: CHENGDU XGIMI TECHNOLOGY CO., LTD., Sichuan (CN)

(72) Inventors: Hao Wu, Sichuan (CN); Fang Xie, Sichuan (CN); Yang Liao, Sichuan (CN)

(73) Assignee: CHENGDU XGIMI TECHNOLOGY CO., LTD., Chengdu (CN)

( * ) Notice: Subject to any disclaimer, the term of this patent is extended or adjusted under 35 U.S.C. 154(b) by 343 days.

(21) Appl. No.: 17/600,157

(22) PCT Filed: Aug. 12, 2020

(86) PCT No.: PCT/CN2020/108688
§ 371 (c)(1),
(2) Date: Sep. 30, 2021

(87) PCT Pub. No.: WO2022/027720
PCT Pub. Date: Feb. 10, 2022

(65) Prior Publication Data
US 2022/0322162 A1 Oct. 6, 2022

(30) Foreign Application Priority Data
Aug. 3, 2020 (CN) .......................... 202010764631.6

(51) Int. Cl.
*H04W 36/08* (2009.01)
*H04W 8/02* (2009.01)
(Continued)

(52) U.S. Cl.
CPC ......... *H04W 36/0027* (2013.01); *H04W 8/02* (2013.01); *H04W 36/08* (2013.01); *H04W 36/30* (2013.01)

(58) Field of Classification Search
CPC ... H04W 36/0027; H04W 8/02; H04W 36/08; H04W 36/30; H04W 36/36; H04W 36/18; H04W 84/12; H04W 36/0011
See application file for complete search history.

(56) References Cited

U.S. PATENT DOCUMENTS

| | | | | |
|---|---|---|---|---|
| 2009/0088075 | A1* | 4/2009 | Orlassino | H04W 36/18 455/41.2 |
| 2011/0317664 | A1* | 12/2011 | Schlenk | H04W 40/36 370/331 |

(Continued)

FOREIGN PATENT DOCUMENTS

| | | |
|---|---|---|
| CN | 101146045 A | 3/2008 |
| CN | 101610553 A | 12/2009 |

(Continued)

OTHER PUBLICATIONS

The First Office Action for Chinese Application No. 202010764631.6, dated Oct. 13, 2020, 17 pages.
(Continued)

*Primary Examiner* — Kenneth T Lam
(74) *Attorney, Agent, or Firm* — East IP P.C.

(57) ABSTRACT

The application relates to the field of wireless communication, and discloses a roaming method in a multi-link scenario, a multi-link device and a storage medium. The roaming method in the multi-link scenario includes: selecting a target network access device that meets a condition; disconnecting a logical entity on a secondary link of an original network access device from the original network access device; establishing a connection of the logical entity with the target network access device; determining a link through which the logical entity is connected with the target network access device as a primary link; and disconnecting a connection of the other logical entity other than the logical entity with the original network access device. The appli- (Continued)

cation realizes roaming of a terminal among different network access devices through link management and interactive control, ensuring service continuity and avoiding packet loss.

19 Claims, 2 Drawing Sheets

(51) Int. Cl.
*H04W 36/00* (2009.01)
*H04W 36/30* (2009.01)

(56) References Cited

U.S. PATENT DOCUMENTS

| | | | | |
|---|---|---|---|---|
| 2017/0180088 | A1* | 6/2017 | Adachi | H04W 48/10 |
| 2017/0181191 | A1* | 6/2017 | Wen | H04W 72/541 |
| 2017/0265117 | A1* | 9/2017 | Yen | H04L 43/16 |
| 2018/0205502 | A1* | 7/2018 | Merlin | H04W 76/15 |
| 2019/0150041 | A1* | 5/2019 | Shao | H04W 36/08 |
| | | | | 370/331 |
| 2022/0248465 | A1* | 8/2022 | Yoshikawa | H04W 72/121 |
| 2022/0330367 | A1* | 10/2022 | Inohiza | H04W 8/24 |
| 2023/0164661 | A1* | 5/2023 | Kim | H04W 40/24 |
| | | | | 370/328 |

FOREIGN PATENT DOCUMENTS

| | | |
|---|---|---|
| CN | 101631371 A | 1/2010 |
| CN | 101810033 A | 8/2010 |
| CN | 102726100 A | 10/2012 |
| CN | 103686890 A | 3/2014 |
| CN | 107071840 A | 8/2017 |
| CN | 107708163 A | 2/2018 |
| CN | 109257783 A | 1/2019 |
| CN | 109413226 A | 3/2019 |
| CN | 111345063 A | 6/2020 |
| CN | 111417154 A | 7/2020 |
| JP | 2008017148 A | 1/2008 |
| WO | 2020091332 A1 | 5/2020 |
| WO | 2020112244 A2 | 6/2020 |

OTHER PUBLICATIONS

The International search report for PCT Application No. PCT/CN2020/108688, dated May 8, 2021, 5 pages.
The First Office Action for Japan Application No. 2021-554417, dated Nov. 15, 2022, 6 pages.
Guogang Huang (Huawei), Tentative Re(Association) for Non-AP MLD, Jul. 29, 2020, 25 pages.
Sharan Naribole (Samsung), MLO Constraint Indication and Operating Mode, Apr. 24, 2020, 29 pages.
Dave Cavalcanti (Intel Corporation), QoS Management framework in 802.11be, Jun. 25, 2020, 30 pages.
Taewon Song (LG Electronics), Multi-link Acknowledgement, Jan. 9, 2020, 16 pages.

\* cited by examiner

ROAMING METHOD IN A MULTI-LINK SCENARIO, MULTI-LINK DEVICE, AND STORAGE MEDIUM

REFERENCE TO RELATED APPLICATION

The application is a national stage of an international application No, PCT/CN2020/108688 filed on Aug. 12, 2020, which claims a priority of the Chinese patent application No. 202010764631.6, filed on Aug. 3, 2020 and entitled by "ROAMING METHOD IN A MULTI-LINK SCENARIO, MULTI-LINK DEVICE AND STORAGE MEDIUM", both of which are incorporated herein by reference in its entirety.

TECHNICAL FIELD

The application relates to the field of wireless communication, and in particular to a roaming method in a multi-link scenario, a multi-link device and a storage medium.

BACKGROUND

An 802.11be network, also known as Extremely High Throughput (EHT) network, achieves extremely high throughput through a range of system features and various mechanism enhancements. As continuous growth in use of a wireless local area network (WLAN), it is becoming increasingly important to provide wireless data services for various environments, such as at home, in an office, or at a hotspot. In particular, video traffics will continue to be the main traffic type in many WLAN deployments. Due to emergence of 4k and 8k videos (with a rate of 20 Gbps in an uncompressed state), throughput requirements of these applications are continually being increased. New types of high-throughput and low-latency applications such as a virtual reality application, an augmented reality application, a gaming application, a remote office application, and a cloud computing application are also being greatly increased (for example, a real-time game requires a latency of less than 5 milliseconds).

In view of requirements of high throughput and strict latency of these applications, a user expects a higher throughput, a higher reliability, a small latency and jitter, and a higher power efficiency when using a WLAN to support such an application. A user also expects an improved integration with a Time Sensitive Network (TSN) to support the applications in a heterogeneous Ethernet or the WLAN. The 802.11be network aims to ensure competitiveness of the WLAN by further improving total throughput and reducing latency, while ensuring backward compatibility and coexistence with older technical standards. An 802.11 compatible device is operable at frequencies of 2.4 GHz, 5 GHz and 6 GHz.

Regarding the 802.11be network, it is proposed to establish multiple data transmission links between a terminal and an access point for simultaneous transmission to improve a transmission efficiency, so as to achieve the above discussed purposes.

SUMMARY

When the terminal of the wireless local area network is moving, it may change from the coverage of one network access device (such as a router, access point AP, etc., below the description is given by taking the AP as an example) to the coverage of another network access device, which is referred to as roaming. Generally, a single-link terminal has only one link, so it must first disconnect the connection with the original AP, and then establish a connection with the new AP, which will cause service interruption. The characteristics of the multi-link terminal enable the terminal to establish two or more links at the same time, so that the method of link management and interactive control of this application can be used to enable the terminal to maintain continuity of a service when roaming between different APs. Continuity.

In a first aspect of the present application, there is provided a roaming method in a multi-link scenario, including: selecting a network access device that meets a condition as a target network access device; sending, by a first logical entity corresponding to a primary link of an original network access device or a second logical entity corresponding to a first secondary link of the original network access device, a link disconnection request message to request a disconnection of the second logical entity from the original network access device; sending, by the second logical entity, an association request message to the target network access device after the disconnection of the second logical entity from the original network access device; receiving, by the second logical entity, an association response message sent by the target network access device, and establishing a connection with the target network access device; and sending, by the first logical entity after the second logical entity has established the connection with the target network access device, a disassociation request message to the original network access device to disconnect the first logical entity or disconnect the first logical entity and a logical entity other than the first logical entity and the second logical entity from the original network access device.

By disconnecting a connection of a logical entity other than the second logical entity from the original network access device after the second logical entity has established a connection with the target network access device, the application ensures service continuity and avoids packet loss.

In an embodiment, the method of selecting the target network access device may include: searching for a signal from a network access device other than the original network access device when signal strength or signal quality of the original network access device is lower than a first preset threshold value for a first preset detection time period; and determining the network access device as the target network access device when the signal strength or the signal quality of the network access device is higher than a second preset threshold value for a second preset detection time period.

In another embodiment, the method of selecting the target network access device may include: searching for a network access device other than the original network access device when load of the original network access device exceeds a third preset threshold value; and determining the network access device as the target network access device when the load of the network access device is lower than a fourth preset threshold value.

In an embodiment, the method of selecting the target network access device may further include: selecting, when there are a plurality of network access devices that meet the condition, a network access device from the plurality of network access devices that has highest signal strength, or has best signal quality, or provides highest QoS, or has least network load as the target network access device.

In an embodiment, the link disconnection request message may include a reason parameter for indicating that a reason for the disconnection is a "roaming attempt", or/and comprises an updated correspondence between service identifiers and links.

In an embodiment, the method may further include: receiving, by the first logical entity or the second logical entity, a link disconnection response message sent by the original network access device, wherein the link disconnection response message comprises the correspondence between service identifiers and link; and storing the received correspondence between service identifiers and link.

In an embodiment, the establishing, by the second logical entity, the connection with the target network access device may include: setting a primary or secondary link identifier corresponding to the second logical entity in a locally stored table of correspondence between logical entities and links as a temporary primary link, and setting a corresponding network access device address as an address of the target network access device.

In an embodiment, the establishing, by the second logical entity, the connection with the target network access device may include: clearing a primary link identifier of the first logical entity in the locally stored table of correspondence between logical entities and links, and setting the primary or secondary link identifier corresponding to the second logical entity as a primary link.

In an embodiment, the method may further include: establishing a connection of the first logical entity and/or a connection of a logical entity other than the first logical entity and the second logical entity with the target network access device according to operational link information of the target network access device obtained during establishment of the connection of the second logical entity with the target network access device.

In an embodiment, the method may further include: setting a primary or secondary link identifier corresponding to the first logical entity and/or corresponding to a logical entity other than the first logical entity and the second logical entity in the locally stored table of correspondence between logical entities and links as a secondary link, and setting a corresponding network access device address as the address of the target network access device.

Since the primary link is related to management and control of the entire device, higher data transmission reliability is required. There may be the case that the data transmission reliability of a current primary link is not high enough. At this time, a primary link exchange is required to switch the primary link to a link with higher data transmission reliability.

In an embodiment, the method may further include: sending, by the second logical entity, a link exchange request message to the target network access device, wherein the link exchange request message includes a link identifier, a corresponding logical entity address and a primary link identifier; receiving, by the second logical entity, a link exchange response message sent by the target network access device, wherein the link exchange response message includes the link identifier, the corresponding logical entity address and the primary link identifier; and setting, according to the link exchange response message, a primary or secondary link identifier of a logical entity corresponding to the primary link identifier as the primary link, and setting a primary or secondary link identifier of a logical entity other than the logical entity corresponding to the primary link identifier as the secondary link.

In an embodiment, the multi-link scenario means that a terminal multi-link device is connected to a network access device through multiple links, and the method may further include: setting one of the links as the primary link on which data transmission is performed, broadcast information is read and transmission of a management frame or a control frame that acts on all of the links is performed, and setting remaining links as secondary links on each of which data transmission is performed or both data transmission and transmission of a management frame or control frame that operates on the link are performed.

In an embodiment, the association request message comprises an indication of a "roaming attempt", and the method may further include: reading, by the target network access device, the indication of the "roaming attempt" after reception of the association request message, sending an association response message to the second logical entity and sending a DS-STA-Notify message to a server.

After the target network access device reads the indication of the "roaming attempt", it sends the DS-STA-Notify message to the server, so that the server instantly associates the terminal multi-link device with the target network access device, and data directed to the terminal multi-link device is then sent to the target network access device to avoid packet loss.

In a second aspect of the present application, there is provided a multi-link device which is a physical device for receiving and transmitting data by multiple logical entities independently on different links, each of the logical entities including an independent module for receiving and transmitting data, the multi-link device including: a target network access device selection unit configured to select a network access device that meets a condition as a target network access device; a first logical entity corresponding to a primary link of an original network access device, and configured to send a link disconnection request message to the original network access device to request a disconnection of a second logical entity from the original network access device and send, a connection of the second logical entity with the target network access device has been established, a disassociation request message to the original network access device to disconnect the first logical entity or disconnect the first logical entity and a logical entity other than the first logical entity and the second logical entity from the original network access device; and the second logical entity corresponding to a first secondary link of the original network access device, and configured to send a link disconnection request message to the original network access device to request the disconnection of the second logical entity from the original network access device, send an association request message to the target network access device after the disconnection from the original network access device, receive an association response message sent by the target network access device, and establish the connection with the target network access device.

In a third aspect of the present application, there is provided a multi-link device, including: a memory storing programs; and a processor coupled to the memory, wherein the programs, when executed by the processor, perform the roaming method in the multi-link scenario according to the first aspect or any one of the possible implementations for the first aspect.

In a fourth aspect of the present application, there is provided a computer-readable storage medium including computer instructions, that when executed on a terminal, perform the roaming method in the multi-link scenario according to the first aspect or any one of the possible implementations for the first aspect.

It should be noted that the multi-link device described in the second aspect and the third aspect and the computer-readable storage medium described in the fourth aspect of the application are used to execute the method provided in the first aspect as described above, and therefore can achieve the same beneficial effects as the method described in the first aspect, and thus their embodiments of the application will not be repeated here.

The application realizes roaming of a terminal among different network access devices through link management and interactive control, ensuring service continuity and avoiding packet loss.

BRIEF DESCRIPTION OF THE DRAWINGS

The application will be described by way of embodiments and with reference to the accompanying drawings, in which.

DETAILED DESCRIPTION

In order for a better understanding by those skilled in the art of technical solutions of the application, technical solutions in embodiments of the application will be clearly and completely described in conjunction with the accompanying drawings of the embodiments of the application. Apparently, the described embodiments are only a part of embodiments of the application, rather than all the embodiments. It should be understood that the specific embodiments described here are only used to explain the application, rather than limiting the application. Based on the embodiments in the application, those skilled in the art can anticipate other embodiments without inventive efforts, all of which fall within the protection scope of the application. In addition, although the disclosure in the application is described by way of one or more exemplary examples, it should be understood that various aspects of the disclosure can be individually configured as respective complete technical solutions. The following embodiments and features thereof can be combined with each other without conflicts.

In the embodiments of the application, terms such as "exemplary" and "for example" are used for providing examples, explanations, or illustrations. Any embodiment or design solution described as an "example" in the application should not be construed as being more preferable or having more advantageous than other embodiments or design solutions. Rather, the term "example" is used to present a concept in a concrete way.

Unless otherwise defined, the technical or scientific terms used in the application have their usual meanings as understood by those skilled in the field. The terms of "first", "second" and similar words used in the application do not denote any order, quantity or importance, but are only used for distinguishing descriptions. The terms of "include" or "comprise" and other similar words mean that an element or item appearing before the word contains an element or item listed after the word and their equivalents, and does not exclude other elements or items. The term "and/or" includes any and all combinations of one or more of associated items as listed. The technical solutions in the application will be described below in conjunction with the accompanying drawings.

The technical solutions of the application will be described below in conjunction with the accompanying drawings.

A wireless local area network (Wireless Local Area Network, WLAN) may include terminals and an access point (Access Point, AP). One access point can correspond to multiple terminals. Multiple links can be established between the terminal(s) and the access point. The multiple links can transmit data at the same time to improve data transmission efficiency and achieve high network throughput. The terminals can comprises a single-link device and a multi-link device (Multi-link Device, MLD). Each single-link device transmits data to an access point through a single link. The multi-link device includes multiple logical entities, and each of the logical entities performs data transmission with an access point through seperate links. The link is a wireless resource used to data transmission.

The multi-link scenario means that a terminal multi-link device is connected to a network access device through multiple links, in which one link is set as a primary link, and remaining links are set as secondary links. On the primary link, data transmission is performed, broadcast information is read, and transmission of a management frame or a control frame such as a connection request for all of the links, an authentication or authorization and a link switching request is performed; and on the secondary link, data transmission or data transmission and transmission of a management frame or a control frame that acts on the link are performed. The primary link is related to management and control of the entire device, so higher data transmission reliability is required, for example, an encoding method with a lower rate or a lower frequency is used to ensure the data transmission reliability.

Figure 1:
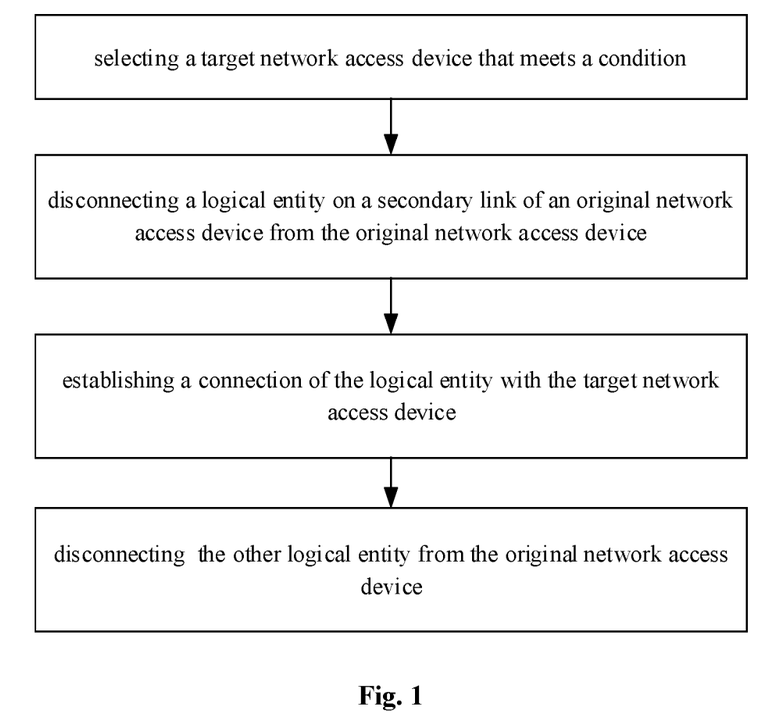
FIG. 1 is a schematic diagram of a basic flow of a roaming method in a multi-link scenario according to an embodiment of the application.

FIG. 1 is a schematic diagram of a basic flow of a roaming method in a multi-link scenario according to an embodiment of the application. As shown in FIG. 1, a basic concept of the roaming method in the multi-link scenario includes: selecting a target network access device that meets a condition; disconnecting a logical entity on a secondary link of an original network access device from the original network access device; establishing a connection of the logical entity with the target network access device; determining a link through which the logical entity is connected with the target network access device as a primary link of the target network access device; and disconnecting a connection of a logical entity other than the logical entity with the original network access device.

In some embodiments, a connection between another logical entity other than the logical entity corresponding to the secondary link with the target network access device is also established according to operational link information of the target network access device, and a link though which the another logical entity is connected with the target network access device is set as a secondary link of the target network access device. Since the primary link requires higher data transmission reliability, in some embodiments, it is also necessary to exchange the primary link of the target network access device, so that the primary link of the target network access device employs an encoding method with a lower rate or uses a link with a lower frequency.

The network access device may be a router, an access point (Access Point, AP), etc. In the following embodiments, the application is described by taking an AP as an example. The application is also described by taking two links as an example, but is not limited herein, and its implementation process is applicable to a scenario with more than two links.

Figure 2:
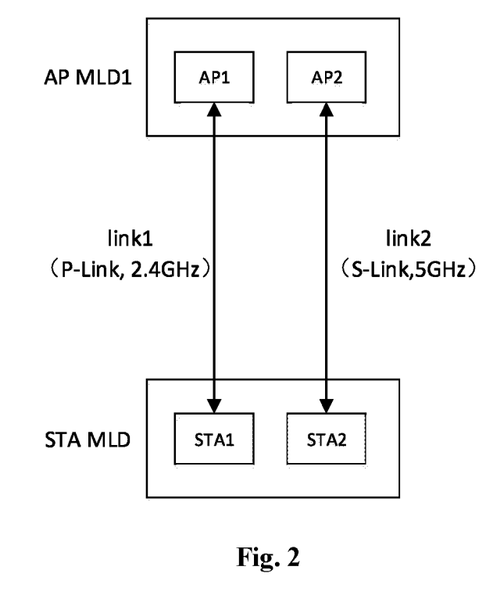
FIG. 2 is a schematic diagram of a terminal connected to an original access point according to an embodiment of the application.

As shown in FIG. 2, the terminal multi-link device STA MLD includes two logical entities, STA1 and STA2, and is connected to an original network access device AP MLD1 through two links, link1 and link2. The AP MLD1 includes logical entities AP1 and AP2. The STA1 and AP1 perform data transition on the link1, and the STA2 and AP2 perform data transmission on the link2. The link1 is a link operating at a 2.4 GHz frequency, and is a primary link of the AP MLD1, and the link2 is a link operating at a 5 GHz frequency and is a secondary link of the AP MLD1. Here, the link1 and link2 are respective link identifiers. The roaming method in the multi-link scenario include the followings.

1. When a movement of the STA MLD has occurred, the STA MLD may detect that a signal from the AP MLD1 is getting worse and thus searches for a signal from another AP. In some embodiments, a threshold value, Th_Roam_Out, and a detection time period, DTime1, may be preset in the STA MLD. When signal strength or signal quality of the AP MLD1 is lower than the threshold value, Th_Roam_Out, for the time period of the DTime1, the search for a signal from another Ap is made. In some other embodiments, the search for a signal from another Ap may be made when load of the AP MLD1 exceeds a preset threshold value or when a network of the AP MLD1 has a failure, etc.

2. An AP that meets a condition is selected as a target AP. For example, the selection may be performed as follows: presetting a threshold value, Th_Roam_In, and a detection time period, DTime2; if signal strength or signal quality of the AP is higher than the threshold value, Th_Roam_In, for a time period of the DTime2, setting the AP as the target AP. In some other embodiments, an AP whose load is lower than a preset threshold value may be selected as the target AP. When there are a plurality of APs meeting the condition, the terminal can choose one by itself, such as choosing the one having highest signal strength, or having best signal quality, or providing highest QoS, or having least network load. In the embodiment, the AP MLD2 is selected as the target AP.

3. The STA MLD sends a link disconnection request message to the AP MLD1 via the STA1 or the STA2, to request to disconnect the link2, that is, disconnect the STA2 from the AP MLD1.

In some embodiments, during this request and response process, the AP MLD1 and the STA MLD need to synchronously modify a correspondence between TID (service identifier) and links. A specific method may include:

including an updated correspondence between TIDs and links in the link disconnection request message;

sending, by the AP MLD1, a link disconnection response message to the STA MLD, wherein the link disconnection response message includes the correspondence between TIDs and links;

receiving, by the STA1 or STA2 of the STA MLD, the link disconnection response message sent by the AP MLD1, and stores the received correspondence between TIDs and links.

For example, an original correspondence between TIDs and links is shown in Table 1, and the updated correspondence between the TIDs and links is shown in Table 2.

TABLE 1

| TID | link |
| --- | --- |
| 0-7 | link1, link2 |
| 8-15 | link2 |

TABLE 2

| TID | link |
| --- | --- |
| 0-7 | link1 |
| 8-15 | link1 |

In some embodiments, the link disconnection request message may also include a reason parameter for indicating that a reason for the disconnection is a "roaming attempt".

Figure 3:
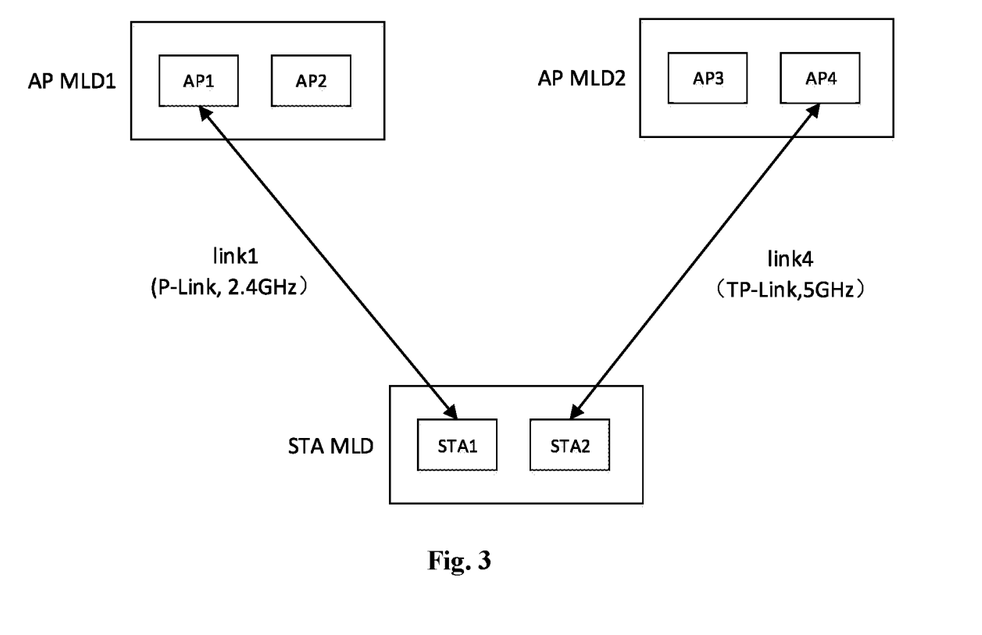
FIG. 3 is a schematic diagram of a process for establishing a connection of a terminal with a target access point according to an embodiment of the application.

4. After the disconnection of the STA2 from the AP MLD1, an association request message is sent by the STA2 to the AP MLD2. In some embodiments, a "roaming attempt" is indicated in the association request message.

5. After receiving the association request message, the AP MLD2 sends an association response message to the STA MLD. In some embodiments, the association request message may include an indication of a "roaming attempt". In this embodiment, after reception of the association request message, the AP MLD2 reads the indication of the "roaming attempt", then sends an association response message to the STA MLD, and sends a DS-STA-Notify message to a server for informing the server of an association relationship between the terminal and the AP after the terminal connects to the AP. The server sends service data intended to the terminal to the updated AP after reception of the message, and still sends data intended to the terminal through the original AP before reception of the message. Upon reception of the message, data is sent to the terminal via the updated AP, so service data will not be interrupted.

6. After reception of the association response message, the STA2 establishes a connection of the STA2 with the AP MLD2, and uses a link4 connecting the STA2 and an AP4 in the AP MLD2 as a primary link of the AP MLD2 on which data transmission is performed, as shown in FIG. 3.

7. After the connection of the STA2 with the AP MLD2 has been established, the STA1 sends a disassociation request message to the AP MLD1 to disconnect the STA1 from the AP MLD1, that is, to disassociate the STA MLD from the AP MLD1 through a Deassociation process.

In some embodiments, the roaming method may further include the following step:

8. establishing a connection of the STA1 with the AP MLD2 according to operability link information of the AP MLD2 obtained during establishment of the connection of the STA2 with the AP MLD2, as a secondary link of the AP MLD2.

In some embodiments, an exchange of the primary link may be performed, and specifically may include the following step:

9. The STA2 imitates a link exchange request message to the AP MLD2, wherein the link exchange request message includes a link identifier, a corresponding logical entity address, and a primary link identifier. In the embodiment, the corresponding STA address is an address of the STA1.

10. After reception of the link exchange request message, if the AP MLD2 accepts the link exchange request, it sends a link exchange response message to the STA2. The link exchange response message includes the link identifier, the corresponding logical entity address and the primary link identifier.

11. After the STA MLD receives the link exchange response message through the STA2, it sets a primary or secondary link identifier of a logical entity corresponding to the primary link identifier (the STA1 in the embodiment) as a primary link according to the link exchange response message, and set primary or secondary link identifiers of logical entities other than the logical entity corresponding to the primary link identifier as secondary links. That is, the STA1 is set as an operating entity on the primary link, the link connecting the STA1 and the AP MLD2 is set as the primary link of the AP MLD2, the STA2 is set as an operating entity on a secondary link, and the link connecting the STA2 with the AP MLD2 is set as the secondary link of the AP MLD2.

In some embodiments, the STA MLD stores a table of correspondence between logical entities and links locally for identifying primary or secondary links. For example, the table of correspondence between logical entities and links includes a logical entity address field, a link identifier field, a primary or secondary link identifier field, and an AP address field. When the STA MLD is connected with the AP MLD1, the table of correspondence between logical entities and links is set as shown in Table 3, where P-link represents a primary link, and S-link represents a secondary link.

TABLE 3

| Logical Entity Address | Link Identifier | Primary or Secondary Link Identifier | AP Address |
| --- | --- | --- | --- |
| STA1 | link 1 | P-Link | AP MLD1 |
| STA2 | link 1 | S-Link | AP MLD1 |

When the STA2 has connected with the AP MLD2 but the STA1 has not been disconnected from the AP MLD1, the primary or secondary link identifier corresponding to STA2 in the locally stored table of correspondence between logical entities and links is set as a temporary primary link, and a corresponding network access device address is modified as an address of the target network access device. Illustratively, the modified table of correspondence between logical entities and links is shown in Table 4, where TP-link represents a temporary primary link.

TABLE 4

| Logical Entity Address | Link Identifier | Primary or Secondary Link Identifier | AP Address |
| --- | --- | --- | --- |
| STA1 | link1 | P-Link | AP MLD1 |
| STA2 | link4 | TP-Link | AP MLD2 |

After the STA1 disconnects from the AP MLD1, the primary link identifier of the STA1 is cleared, and the primary or secondary link identifier corresponding to the STA2 is set as the primary link. Illustratively, the modified table of correspondence between logical entities and links is shown in Table 5.

TABLE 5

| Logical Entity Address | Link Identifier | Primary or Secondary Link Identifier | AP Address |
| --- | --- | --- | --- |
| STA1 | null | null | null |
| STA2 | link4 | P-Link | AP MLD2 |

After the STA1 has been connected with the AP MLD2, the primary or secondary link identifier corresponding to the STA1 is modified as a secondary link. Illustratively, the modified table of correspondence between logical entities and links is shown in Table 6.

TABLE 6

| Logical Entity Address | Link Identifier | Primary or Secondary Link Identifier | AP Address |
| --- | --- | --- | --- |
| STA1 | Link3 | S-Link | AP MLD2 |
| STA2 | link4 | P-Link | AP MLD2 |

After the primary link has been exchanged, the primary or secondary link identifier corresponding to the STA1 is modified as the primary link, and the primary or secondary link identifier corresponding to the STA2 is modified to a secondary link. Illustratively, the modified table of correspondence between logical entities and links is shown in Table 7.

TABLE 7

| Logical Entity Address | Link Identifier | Primary or Secondary Link Identifier | AP Address |
| --- | --- | --- | --- |
| STA1 | Link3 | P-Link | AP MLD2 |
| STA2 | link4 | S-Link | AP MLD2 |

The embodiments of the present application also provide a multi-link device configured to implement the roaming method in the multi-link scenario performed by the multi-link device described in the foregoing embodiments, which is implemented by hardware or by hardware executing software. The hardware or software includes one or more units corresponding to the above functions, for example, a target network access device selection unit, a first logical entity and a second logical entity, etc.

The embodiments of the present application further provides a multi-link terminal, including a memory storing programs and a processor coupled to the memory and configured to execute the programs to implement the roaming method performed in a multi-link scenario by a multi-link terminal in the foregoing embodiments.

The embodiments of the present application further provide a computer-readable storage medium including computer instructions, which when executed on a terminal, perform the method in the foregoing embodiments.

It should be understood that the serial numbers for the above-mentioned processes in various embodiments of the present application does not mean an order of execution. Some or all of the steps can be executed in parallel or one after the other. The order of execution of the respective processes should be determined based on their functions and an internal logic thereof, and it should not define any limitation to the implementation processes of the embodiments of the present application.

It should be anticipated by those skilled in the art that the various units and algorithm steps of the examples described in conjunction with the embodiments of the application can be implemented by electronic hardware or a combination of computer software and electronic hardware. Whether these functions are implemented by hardware or software depends on a specific application and design constraint conditions of the technical solution. Those skilled in the art can use different methods for respective specific applications to implement the described functions, which should not be considered beyond the scope of the application.

It should be understood by those skilled in the art that specific operation processes of the above-described system, device and unit can refer to corresponding processes in the foregoing method embodiments, and thus are not repeated in order for convenience and conciseness.

It should be understood that the system, device and method disclosed in the embodiments of the application may be implemented in other ways. For example, the device embodiments described above are only illustrative, and division of the units is only a division based on logical functions, and may be any other division in an actual implementation where multiple units or components may be combined or integrated into another system, or some features can be ignored or not implemented, for example. In addition, the shown or discussed mutual coupling or direct coupling or communication connection may be alternatively an indirect coupling or communication connection through some interfaces, devices or units, and may be in electrical, mechanical or other forms.

The units described as separate components may or may not be physically separated, and the components shown as units may or may not be physical units, that is, they may be located in one place, or may be distributed on multiple network units. Some or all of the units may be selected according to actual needs to achieve the objectives of the solutions of the embodiments.

In addition, the functional units in each embodiment of the application may be integrated into one processing unit, or may exist individually and physically, or may be integrated into respective units on a basis of two or more units.

If the function is implemented in a form of a software functional unit and sold or used as an independent product, it can be stored in a computer readable storage medium. Based on this understanding, the essential technical solutions of the application or a part of the technical solutions that constitutes contributions on the related art or a part of the technical solutions can be embodied in a form of a software product, and the computer software product may be stored in a storage medium including instructions that are executed by a computer device (which may be a personal computer, a server, a network device, or a terminal device, etc.) to perform all or a part of the method steps described in the various embodiments of the application. The aforementioned storage medium may include various media that can store program codes such as a USB disk, a mobile hard disk, a ROM, a RAM, a magnetic disk, or an optical disk.

The terms used in the embodiments of the application are provided only for the purpose of describing specific embodiments, and are not intended to limit the present invention. The singular forms indicated by the words of "a", "said" and "the" in the embodiments of the application and the appended claims are also intended to include plural forms, unless it is particularly indicated. It should also be understood that the term "and/or" as used herein refers to and includes any or all possible combinations of one or more associated items as listed. The character "/" in the application generally means that the associated items before and after it are in an "or" relationship.

Depending on context, the word "if" as used herein can be interpreted as "when" or "upon" or "in response to a determination" or "in response to a detection". Similarly, depending on context, the phrase "if it is determined that (alleged condition or event)" or "if it is detected that (alleged condition or event)" can be interpreted as "when it is determined that" or "in response to a determination" or "when it is detected (alleged condition or event)" or "in response to a detection (alleged condition or event)".

It should be understand by those skilled in the art that all of or a part of the steps in the method of the above-discussed embodiments can be implemented by a relevant hardware as instructed by programs. The programs may be stored in a readable storage medium of a device, and are executed to perform all of or a part of the steps. The storage medium may be a FLASH, an EEPROM, etc.

The specific embodiments of the application have been described above, but the protection scope of the application is not limited thereto. Within the technical scope of the application, those skilled in the art can easily anticipate any changes or substitutions, which fall with the protection scope of the application. Therefore, the protection scope of the application is determined by the protection scope of the appended claims.

What is claimed is:

1. A roaming method in a multi-link scenario, comprising:
   selecting a network access device that meets a condition as a target network access device;
   sending, by a first logical entity corresponding to a primary link of an original network access device or a second logical entity corresponding to a first secondary link of the original network access device, a link disconnection request message to request a disconnection of the second logical entity from the original network access device;
   sending, by the second logical entity, an association request message to the target network access device after the disconnection of the second logical entity from the original network access device;
   receiving, by the second logical entity, an association response message sent by the target network access device, and establishing a connection with the target network access device; and
   sending, by the first logical entity after the second logical entity has established the connection with the target network access device, a disassociation request message to the original network access device to disconnect the first logical entity or disconnect the first logical entity and a logical entity other than the first logical entity and the second logical entity from the original network access device,
   wherein the establishing, by the second logical entity, the connection with the target network access device comprises:
   setting, upon the second logical entity is connected with target network access device while the first logical entity has not been disconnected from the original network access device, a primary or secondary link identifier corresponding to the second logical entity in a locally stored table of correspondence between logical entities and links as a temporary primary link, and setting a corresponding network access device address as an address of the target network access device.

2. The roaming method in the multi-link scenario according to claim 1, wherein the selecting the target network access device comprises:
   searching for a signal from a network access device other than the original network access device when signal strength or signal quality of the original network access device is lower than a first preset threshold value for a first preset detection time period; and
   determining the original network access device as the target network access device when the signal strength or the signal quality of the original network access device is higher than a second preset threshold value for a second preset detection time period.

3. The roaming method in the multi-link scenario according to claim 2, wherein the selecting the target network access device further comprises:
   selecting, when there are a plurality of network access devices that meet the condition, a network access device from the plurality of network access devices that has highest signal strength, or has best signal quality, or provides highest QoS, or has least network load as the target network access device.

4. The roaming method in the multi-link scenario according to claim 3, wherein the association request message comprises an indication of a "roaming attempt", and the method further comprises:
reading, by the target network access device, the indication of the "roaming attempt" after reception of the association request message, sending an association response message to the second logical entity and sending a DS-STA-Notify message to a server.

5. The roaming method in the multi-link scenario according to claim 2, wherein the association request message comprises an indication of a "roaming attempt", and the method further comprises:
reading, by the target network access device, the indication of the "roaming attempt" after reception of the association request message, sending an association response message to the second logical entity and sending a DS-STA-Notify message to a server.

6. The roaming method in the multi-link scenario according to claim 1, wherein the selecting the target network access device comprises:
searching for a network access device other than the original network access device when load of the original network access device exceeds a third preset threshold value; and
determining the original network access device as the target network access device when the load of the original network access device is lower than a fourth preset threshold value.

7. The roaming method in the multi-link scenario according to claim 6, wherein the method of selecting the target network access device further comprises:
selecting, when there are a plurality of network access devices that meet the condition, a network access device from the plurality of network access devices that has highest signal strength, or has best signal quality, or provides highest QoS, or has least network load as the target network access device.

8. The roaming method in the multi-link scenario according to claim 6, wherein the association request message comprises an indication of a "roaming attempt", and the method further comprises:
reading, by the target network access device, the indication of the "roaming attempt" after reception of the association request message, sending an association response message to the second logical entity and sending a DS-STA-Notify message to a server.

9. The roaming method in the multi-link scenario according to claim 1, wherein the link disconnection request message comprises a reason parameter for indicating that a reason for the disconnection is a "roaming attempt", or/and comprises an updated correspondence between service identifiers and links.

10. The roaming method in the multi-link scenario according to claim 9, further comprising:
receiving, by the first logical entity or the second logical entity, a link disconnection response message sent by the original network access device, wherein the link disconnection response message comprises the correspondence between service identifiers and link; and
storing the received correspondence between service identifiers and links.

11. The roaming method in the multi-link scenario according to claim 1, wherein the establishing, by the second logical entity, the connection with the target network access device further comprises:
clearing, after the first logical entity has been disconnected from the original network access device, a primary link identifier of the first logical entity in the locally stored table of correspondence between logical entities and links, and setting the primary or secondary link identifier corresponding to the second logical entity as a primary link.

12. The roaming method in the multi-link scenario according to claim 11, further comprising:
establishing a connection of the first logical entity and/or a connection of a logical entity other than the first logical entity and the second logical entity with the target network access device according to operational link information of the target network access device obtained during establishment of the connection of the second logical entity with the target network access device.

13. The roaming method in the multi-link scenario according to claim 12, further comprising:
setting a primary or secondary link identifier corresponding to the first logical entity and/or corresponding to a logical entity other than the first logical entity and the second logical entity in the locally stored table of correspondence between logical entities and links as a secondary link, and setting a corresponding network access device address as the address of the target network access device.

14. The roaming method in the multi-link scenario according to claim 13, further comprising:
sending, by the second logical entity, a link exchange request message to the target network access device, wherein the link exchange request message comprises a link identifier, a corresponding logical entity address and a primary link identifier;
receiving, by the second logical entity, a link exchange response message sent by the target network access device, wherein the link exchange response message comprises the link identifier, the corresponding logical entity address and the primary link identifier; and
setting, according to the link exchange response message, a primary or secondary link identifier of a logical entity corresponding to the primary link identifier as the primary link, and setting a primary or secondary link identifier of a logical entity other than the logical entity corresponding to the primary link identifier as the secondary link.

15. The roaming method in the multi-link scenario according to claim 1, wherein the multi-link scenario means that a terminal multi-link device is connected to a network access device through multiple links, and the roaming method further comprises:
setting one of the links as the primary link on which data transmission is performed, broadcast information is read and transmission of a management frame or a control frame that acts on all of the links is performed, and setting remaining links as secondary links on each of which data transmission is performed or both data transmission and transmission of a management frame or control frame that acts on the link are performed.

16. The roaming method in the multi-link scenario according to claim 1, wherein the association request message comprises an indication of a "roaming attempt", and the method further comprises:

reading, by the target network access device, the indication of the "roaming attempt" after reception of the association request message, sending an association response message to the second logical entity and sending a DS-STA-Notify message to a server.

17. A multi-link device, comprising:
a memory for storing programs; and
a processor coupled to the memory, wherein the programs, when executed by the processor, perform the roaming method in the multi-link scenario according to claim 1.

18. A non-transitory computer-readable storage medium, comprising computer instructions, that when executed on a terminal, perform the roaming method in the multi-link scenario according to claim 1.

19. A multi-link device, comprising:
a target network access device selection unit configured to select a network access device that meets a condition as a target network access device;
a first logical entity corresponding to a primary link of an original network access device, and configured to send a link disconnection request message to the original network access device to request a disconnection of a second logical entity from the original network access device and send, after a connection of the second logical entity with the target network access device has been established, a disassociation request message to the original network access device to disconnect the first logical entity or disconnect the first logical entity and a logical entity other than the first logical entity and the second logical entity from the original network access device; and
the second logical entity corresponding to a first secondary link of the original network access device, and configured to send a link disconnection request message to the original network access device to request the disconnection of the second logical entity from the original network access device, send an association request message to the target network access device after the disconnection from the original network access device, receive an association response message sent by the target network access device, and establish the connection with the target network access device,
wherein the second logical entity is configured to:
set, upon the second logical entity is connected with target network access device while the first logical entity has not been disconnected from the original network access device, a primary or secondary link identifier corresponding to the second logical entity in a locally stored table of correspondence between logical entities and links as a temporary primary link, and set a corresponding network access device address as an address of the target network access device.

* * * * *